United States Patent [19]
Guala

[11] 3,957,944
[45] May 18, 1976

[54] METHOD OF MAKING CLOSURE DEVICE FOR CANS AND OTHER CONTAINERS

[75] Inventor: Piergiacomo Guala, Alessandria, Italy

[73] Assignee: Angelo Guala S.p.A., Alessandria, Italy

[22] Filed: Mar. 25, 1974

[21] Appl. No.: 454,510

[30] Foreign Application Priority Data
Mar. 30, 1973   Italy .................................. 67928/73

[52] U.S. Cl. .............................. 264/295; 264/318; 264/328; 264/334
[51] Int. Cl.² .......................................... B29F 1/14
[58] Field of Search ............ 264/328, 334, 295, 318

[56] References Cited
UNITED STATES PATENTS

| | | | |
|---|---|---|---|
| 2,330,762 | 9/1943 | Tooker | 264/334 X |
| 3,283,047 | 11/1966 | Savary | 264/318 X |
| 3,325,576 | 6/1967 | Kessler | 264/318 |
| 3,570,107 | 3/1971 | Matt | 264/328 X |

*Primary Examiner*—Richard R. Kucia
*Attorney, Agent, or Firm*—Sughrue, Rothwell, Mion, Zinn & Macpeak

[57] ABSTRACT

A method of making a closure device for a can or other container is disclosed wherein the device has a tubular element of flexible plastics material attachable to a container wall and an upper portion which can be folded inwardly inside a lower portion in the manner of a bellows to retract the tubular element which is closed by a removable lid having external handles by which the lid and the tubular element can be pulled out, the lid being removable by rupture of a weakened bridge portion and being re-usable for re-closing the container. The closure device is molded in one piece and then folded into its retracted condition automatically upon withdrawal of the mold core, so that no additional manufacturing steps are necessary.

1 Claim, 8 Drawing Figures

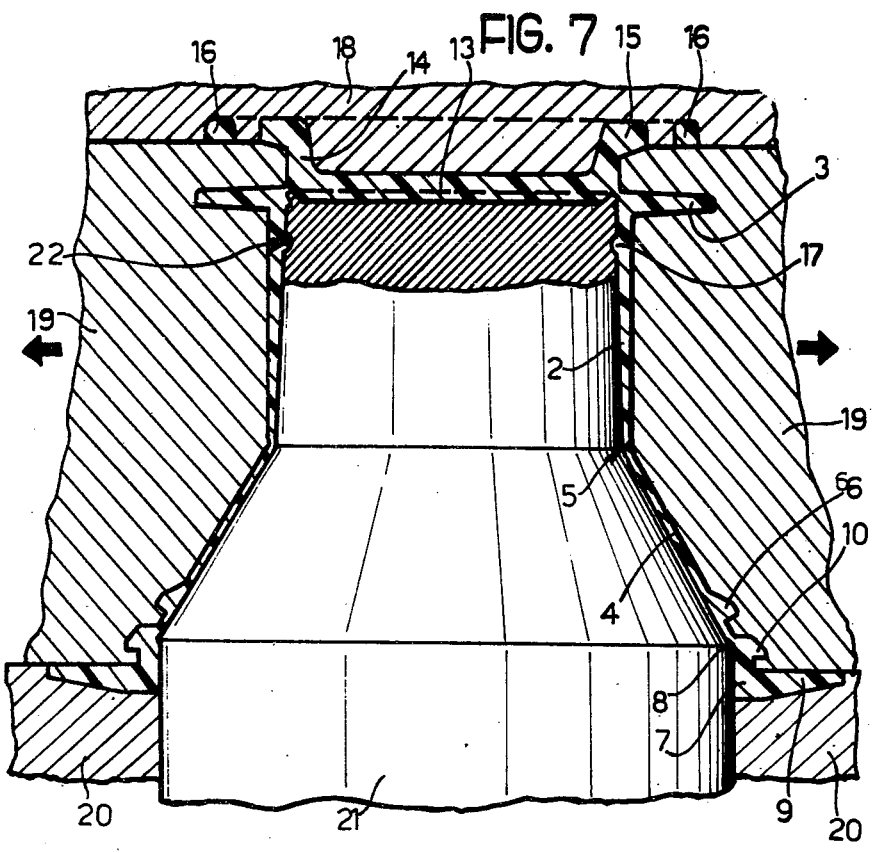
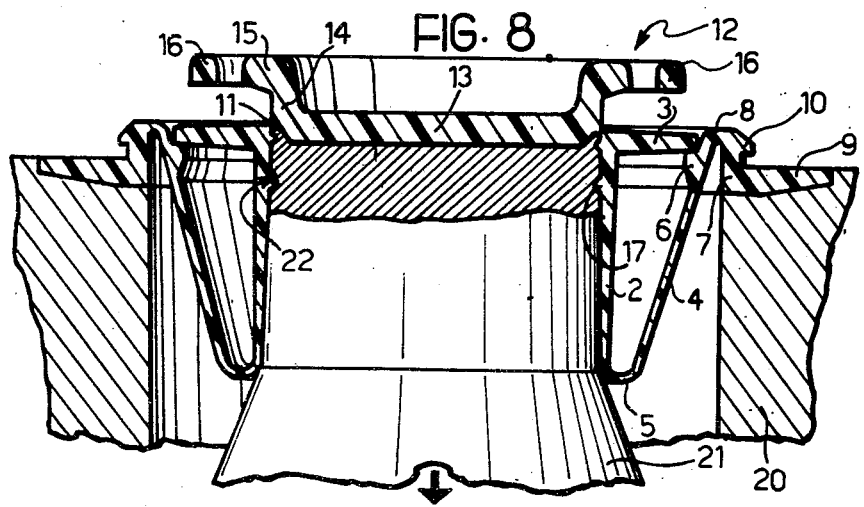

METHOD OF MAKING CLOSURE DEVICE FOR CANS AND OTHER CONTAINERS

BACKGROUND OF THE INVENTION

This invention concerns a method of making closure devices for cans and like containers of the type comprising a flexible tubular element provided with means of attachment to the container and adapted to be folded back telescopically upon itself in the manner of a bellows, so that the tubular element can pass from a retracted condition, in which it is disposed within the interior of the container, to a drawn out or extended condition for pouring out of the contents of the container, in which the element projects beyond the upper wall of the container. The said element is provided at its extremity with a removable portion which constitutes a tamper-indicating seal, and which, when it is removed, uncovers an opening through which the contents of the container can be poured out.

In known devices of the aforesaid type, the removable portion which when removed uncovers the pouring-out opening cannot be replaced upon the tubular element so as to effect subsequent reclosure of the container. Consequently the device has to be provided with an additional stopper or cap for the purpose of effecting its subsequent reclosure.

In such known closure devices the flexible tubular element is molded for insertion in a container in its retracted or folded condition and the requirements of molding prevent the creation of a unitary device with the lips, ridges and like protuberances necessary for the formation of a reclosure member and the formation of such protuberances as drip-catcher lips. Known devices of the molded type therefore always consist of at least two different parts which have to be assembled after separate molding. Such assembly entails a great deal of work and hence enhances the cost of the device.

An object of the present invention is to avoid the aforesaid disadvantages by providing a method of making such a closure device for cans or like containers by molding a single body of plastics material, including the means for subsequent re-closure of the container after its first opening, the device being completely finished upon molding and ready for assembly upon a container without any other additional operations.

SUMMARY OF THE INVENTION

According to the invention there is provided a method of making a closure device for cans and like containers of the type comprising a flexible tubular body molded in plastics material and adapted to be folded over into itself in the manner of a bellows in order to pass from a retracted condition, in which the tubular element is retracted within the interior of the containers, to an extened position in which the element projects outside the container, wherein the molding method allows the making of a device comprising:

— a tubular element of flexible plastics material, molded in a single body and having an upper cylindrical portion, a lower portion and a base portion towards which the lower portion widens;

— an anchoring flange on the base portion having an external groove engageable by an upper wall of the container;

— an external annular drip-catcher lip on said upper cylindrical portion;

— a removable lid fitted to said upper cylindrical portion;

— external handle means on said lid;

— a weakened bridge portion connecting said lid to the top of the cylindrical portion, said bridge portion being predisposed to breakage and said lid being usable for re-closing the container after breakage of the bridge portion;

— an internal molded annular ridge on said cylindrical portion engageable with a groove in a retractable mold core upon molding of the device to cause retraction of the cylindrical portion into the widened lower portion upon extraction of the device from the mold, and — an external annular ridge on said widened lower portion, said drip-catcher lip abutting said ridge to stop the bellows-like folding of the tubular element, and to allow extraction of the mold core from the tubular element upon molding of the device.

The present invention provides a method for the manufacture of a closing device for cans and like containers, said method comprising the steps of making by injection molding in a composite mold having a retractable core a monolithic tubular element of flxible plastics material having an upper cylindrical portion and a lower widened portion, the tubular element being molded in an extended position and including a lid closing the upper cylindrical portion, said lid being removable by tearing and being usable for subsequent re-closing of said cylindrical portion, and said cylindrical portion having an internal annular ridge adapted to engage in a corresponding groove in said mold core, and effecting delivery of the molded device by opening of the mold and axial withdrawal of the mold core, to which the cylindrical portion of the molded tubular element remains initially attached to cause said upper portion of the tubular element to be retracted within the widened lower portion in the manner of a bellows upon withdrawal of the core, said retraction of the upper portion being stopped by the engagement of an outer drip-catcher lip, formed integrally with the cylindrical upper portion, against an annular ridge formed on the base of the lower widened portion, further withdrawal of the mold core causing disengagement of said core from the molded tubular element.

BRIEF DESCRIPTION OF THE DRAWINGS

Further characteristics and advantages of the invention will be apparent from the following detailed description given by way of non-limiting example, with reference to the attached drawings, in which:

FIG. 7 is an axial section showing the first stage in the molding of a closure device according to the invention, and FIG. 8, similar to FIG. 7, shows the stage of extraction of the molded closure device and delivery thereof.

DETAILED DESCRIPTION OF THE ILLUSTRATED EMBODIMENTS

Figure 1:
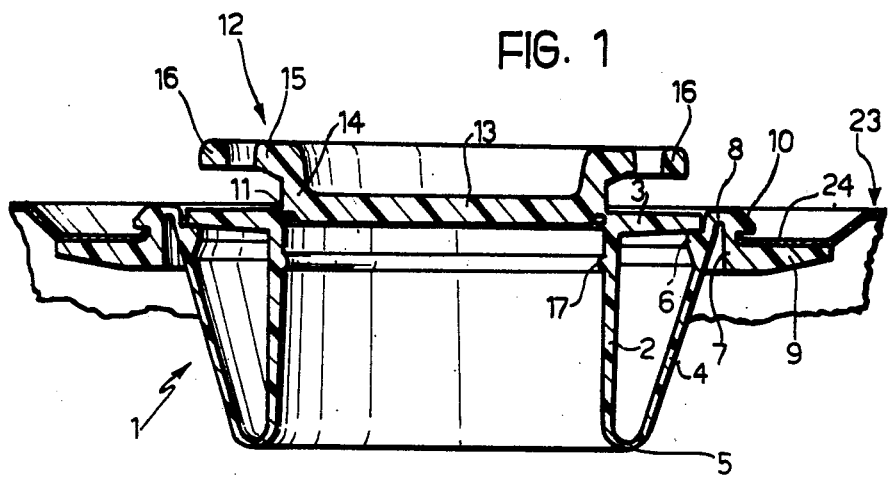
FIG. 1 is an axial section of a closure device according to the invention for cans and similar containers, shown in its retracted condition assembled on the can.

Referring to the drawings, the closure device for cans and similar containers made according to the method this invention comprises a single tubular element 1 molded from flexible plastics material having an upper cylindrical portion 2. The cylindrical portion 2 has at its upper end an external flange 3 acting as a drip-catcher lip. The element 1 also has a lower widened portion 4 connected to the upper portion by means of a thin-walled portion 5. The wider end of the portion 4 is joined by a thin-walled portion 8 to a short cylindrical base portion 7 having an external annular flange 9. The cylindrical portion 7 is also formed with an external annular ridge 10 above the flange 9 and forming therewith an annular groove. This groove allows the snap-in engagement of a shaped lip 24 surrounding an aperture made in the upper wall 23 of the can. The arrangement shown in FIGS. 1 and 2 permits the fitting of the closure device to the upper wall 23 from the inside of the can, such fitting being obviously effected before the upper wall is seamed on to the body of the can.

Figure 2:
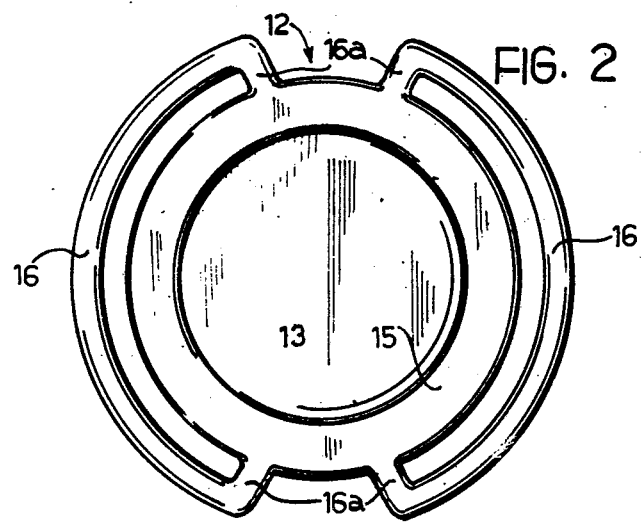
FIG. 2 is a plan view of the removable lid of the closure device of FIG. 1.

The upper cylindrical portion 2 of the tubular element 1 is connected at its upper end, by means of an annular bridge portion of reduced thickness 11, to a removable lid 12. The lid 12 comprises a transverse closure wall 13, a tubular portion 14 and an external annular lip 15 at the upper end of the tubular portion 14. Two part-circular flexible handle members 16 are arranged symmetrically and concentrically outside the lid 12 and are connected to the lip 15 by means of radial stems 16a, as shown in FIG. 2.

The closure device as described is supplied in the foldedin or retracted condition, shown in FIG. 1, in which the cylindrical portion 2 is telescopically withdrawn within the widened portion 4 in the manner of a bellows. This bellows arrangement is made possible by the flexibility of the thinwalled portions 5, 8 interconnecting the upper cylindrical portion 2, the widened portion 4 and the cylindrical base portion 7. In this condition the greater part of the device is housed within the can, and only the lid 12 and the handle members 16 project above the upper wall 23 of the can.

Figure 3:
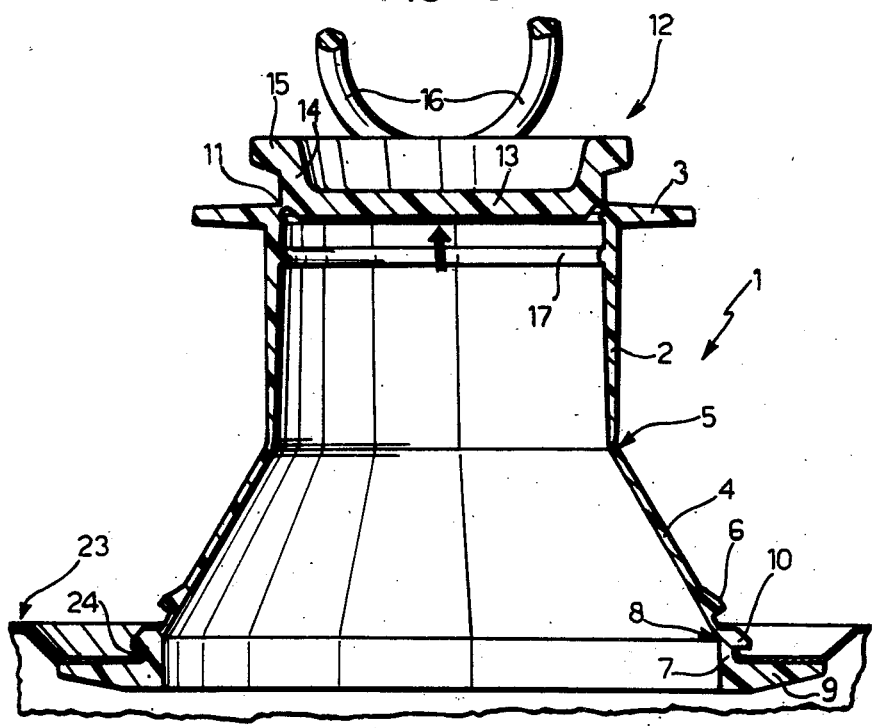
FIG. 3 is an axial section, similar to FIG. 1, showing the device in the extended condition but with the lid still attached.

To open the closure device the user grips the two handle members 16 and pulls them upwards, causing the closure device to be extended from the retracted, bellows-like condition illustrated in FIG. 1, to the extended position shown in FIG. 3, in which both the upper portion 2 and the lower portion 4 of the device project outwardly from the upper wall 23 of the can. Essentially the tubular element 1 when extended forms a small pourer tube which projects from the can.

Figure 4:
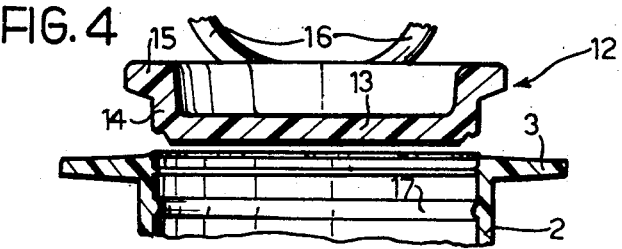
FIG. 4 is a partial axial section, similar to FIG. 3, showing the lid detached.

By pulling further on the handle members 16 the weakened bridge portion 11 is broken, detaching the lid 12 from the tubular body 2, as shown in FIG. 4. The user can then proceed to pour out the amount desired from the can. Subsequently the lid 12 can be inserted into the upper end of the tubular portion 2, thus effecting a satisfactory reclosure which is almost hermetic.

Naturally after re-closing the flexible tubular element 1 must not be folded inwards again into the can, because it would not then be possible to withdraw it.

Figure 6:
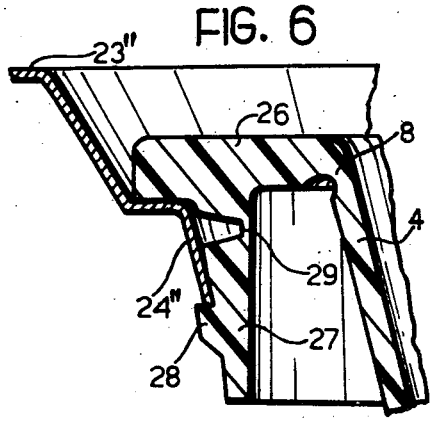
FIGS. 5 and 6 are two partial axial sections showing two variants of the closure device shown in the preceding Figures.
Figure 5:
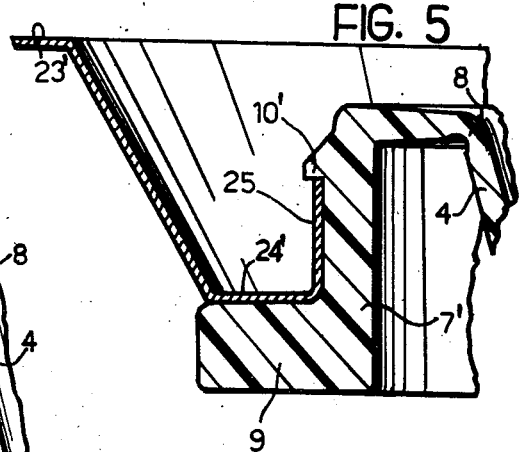

FIGS. 5 and 6 show two variants concerning the means of anchoring the closure device to the can: in FIG. 5 the upper wall 23' of the can has a cylindrical upstanding wall 25 which encircles the opening into which the closure device is snapped. The closure device has a cylindrical base portion 7' which has a considerable axial length in order to allow the said cylindrical wall 25 to fit between the lower flange 9' and the annular ridge 10' of the portion 7'.

In the variant in FIG. 6 the upper wall 23'' of the can has an annular frusto-conical downwardly inclined wall 24'' bounding the cenral aperture in the wall 23'' so that the closure device can be introduced from above. In this embodiment a flat outwardly projcting flange 26 is formed at the base of the widened portion 4. The flange is formed with a depending tubular portion 27 having an external annular ridge 28 of sawtooth shaped cross-section which allows snap-on assembly of the closure device over the lower edge of the wall 24'' of the can. This tubular portion 27 is connected to the flange 26 by means of a weakened bridge portion 29 designed to break should attempts at theft be made.

The closure device herein described therefore consists of a single body of plastics material including all the elements which together form the means of anchoring the closure device to the can, a pourer tube, a drip-catcher lip and a reusable lid adapted for subsequent re-closure of a container to which the closure device is fitted.

MANUFACTURE OF THE CLOSURE DEVICE

The closure device according to the invention is manufactured by a molding method, illustrated in FIGS. 7 and 8. The device is molded initially in the extended condition, using a mold consisting of an upper plate 18, a number of radially displaceable lateral wall elements 19, a base plate 20 and a shaped core 21. The core has at its upper end an annular groove 22 which permits the formation of an inner annular ridge 17 situated almost at the upper end of the cylindrical portion 2 of the closure device.

In the delivery stage, which immediately follows that of molding, the lateral wall elements 19 are moved apart radially, and the core 21 is withdrawn axially downwards and carries with it the cylindrical portion 2 of the molded tubular element, thanks to the interengagement of the groove 22 and the ridge 17 formed therein. The molded element, which is in a highly plastic state in view of the temperature of molding, is caused to reenter upon itself telescopically, assuming the bellows-like form shown in FIG. 8 as the core 21 is withdrawn, this being exactly the form needed for despatch of the closure device and its assembly on to a can. The folding-in of the tubular element is complete when the drip-catcher lip 3 of the cylindrical portion 2 comes into contact with an outer annular ridge 6 formed at the base of the widened portion 4. As soon as these parts come into contact, the inward deformation of the molded tubular element ceases, and the core 21 becomes detached from the cylindrical portion 2.

The device as delivered from the mold is therefore completely finished and requires no further finishing or preassembly operations.

I claim:

1. A method of injection molding a monolithic tubular closure device for cans or similar containers, said device having an upper cylindrical portion with a flange extending radially therefrom, a lid frangibly molded to the upper cylindrical portion, a lower widened portion attached to the upper cylindrical by a thin walled portion, said lower widened portion having an annular ridge formed adjacent its base, in a molding apparatus having an upper plate, a plurality of radially displaceable wall elements, a base plate and a movable, shaped core, said method comprising the steps of:
 a. moving the radially displaceable wall elements inwardly adjacent said upper plate and said base plate so as to define a cavity having the contours of the outer surface of said closure device;
 b. inserting said shaped core into said cavity to define the inner surface of said closure device;
 c. injecting a flexible plastic material into said cavity to form said closure device;
 d. attaching the formed device to said shaped core;
 e. retracting said upper plate away from said molded closure device;
 f. moving the radially displaceable wall elements in a radially outward direction so as to disengage the molded closure device;
 g. retracting said shaped core so as to retract the upper cylindrical portion of said closure device within the lower widened portion; and
 h. detaching said closure device from said shaped core by further retraction of said shaped core such that said radially extending flange contacts said annular ridge to prevent further retraction to the upper cylindrical portion into the lower widened portion, the flexibility of the plastic material allowing the shaped core to detach itself from the closure device.

* * * * *